(12) United States Patent
Livet et al.

(10) Patent No.: US 7,058,398 B2
(45) Date of Patent: Jun. 6, 2006

(54) WIRELESS RADIO RESOURCE MANAGEMENT SYSTEM USING A FINITE STATE MACHINE

(75) Inventors: Catherine Livet, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 414 days.

(21) Appl. No.: 10/648,005

(22) Filed: Aug. 26, 2003

(65) Prior Publication Data

US 2004/0132441 A1    Jul. 8, 2004

Related U.S. Application Data

(60) Provisional application No. 60/406,388, filed on Aug. 28, 2002.

(51) Int. Cl.
*H04Q 7/20* (2006.01)
(52) U.S. Cl. .................. 455/422.1; 455/453; 455/436; 455/446; 455/450; 370/332
(58) Field of Classification Search ................ 455/450, 455/453, 436, 446, 332, 422.1
See application file for complete search history.

(56) References Cited

U.S. PATENT DOCUMENTS

| | | | |
|---|---|---|---|
| 5,818,828 A | 10/1998 | Packer et al. | |
| 5,825,772 A | 10/1998 | Dobbins et al. | |
| 5,884,175 A | 3/1999 | Schiefer et al. | |
| 6,163,524 A | 12/2000 | Magnusson et al. | |
| 6,374,112 B1 | 4/2002 | Widegren et al. | |
| 6,377,817 B1 | 4/2002 | Hakaste et al. | |
| 6,381,458 B1 | 4/2002 | Frodigh et al. | |
| 6,408,228 B1 | 6/2002 | Seem et al. | |
| 6,463,286 B1 | 10/2002 | Salminen | |
| 6,678,281 B1 * | 1/2004 | Chakrabarti et al. | ........ 370/438 |
| 2002/0161914 A1 | 10/2002 | Belenki | |
| 2003/0147370 A1 | 8/2003 | Wu | |

FOREIGN PATENT DOCUMENTS

| | | |
|---|---|---|
| WO | 02/31672 | 4/2002 |
| WO | 02/052869 | 7/2002 |

OTHER PUBLICATIONS

3GPP TS 25.423 v3. 13.0 (Mar. 2003), 3$^{rd}$ Generation Partnership Project; Technical Specification Group Radio Access Network; UTRAN Iur interface RNSAP signaling (Release 1999).

3GPP TS 25.331 v3. 15.0 (Jun. 2003), "3$^{rd}$ Generation Partnership Project; Technical Specification Group Radio Access Network; Radio Resource Control (RRC) protocol sepcification" (Release 1999).

* cited by examiner

*Primary Examiner*—Joseph Feild
*Assistant Examiner*—S. Smith
(74) *Attorney, Agent, or Firm*—Volpe and Koenig, P.C.

(57) ABSTRACT

Radio resource management (RRM) components and methods for a wireless telecommunications system utilize Finite State Machines (FSMs), preferably dividing RMM functions on the basis of Real Time (RT) and Non Real Time (NRT) communications and also UpLink (UL) and DownLink (DL) functions. The use of FSMs for RRM functions promotes Quality of Service (QoS), maximum system capacity and stability and coordination among different RRM algorithms

14 Claims, 3 Drawing Sheets

WIRELESS RADIO RESOURCE MANAGEMENT SYSTEM USING A FINITE STATE MACHINE

CROSS REFERENCE TO RELATED APPLICATION

This application claims priority from U.S. Provisional Application No. 60/406,388 filed Aug. 28, 2002 which is incorporated by reference as if fully set forth.

FIELD OF THE INVENTION

This invention relates to wireless Radio Resource Management (RRM) systems in general and in particular to the use a Finite State Machine (FSM) to implement various functions of a RRM system.

BACKGROUND OF THE INVENTION

Wireless telecommunication systems which include Radio Resource Management (RRM) systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1:
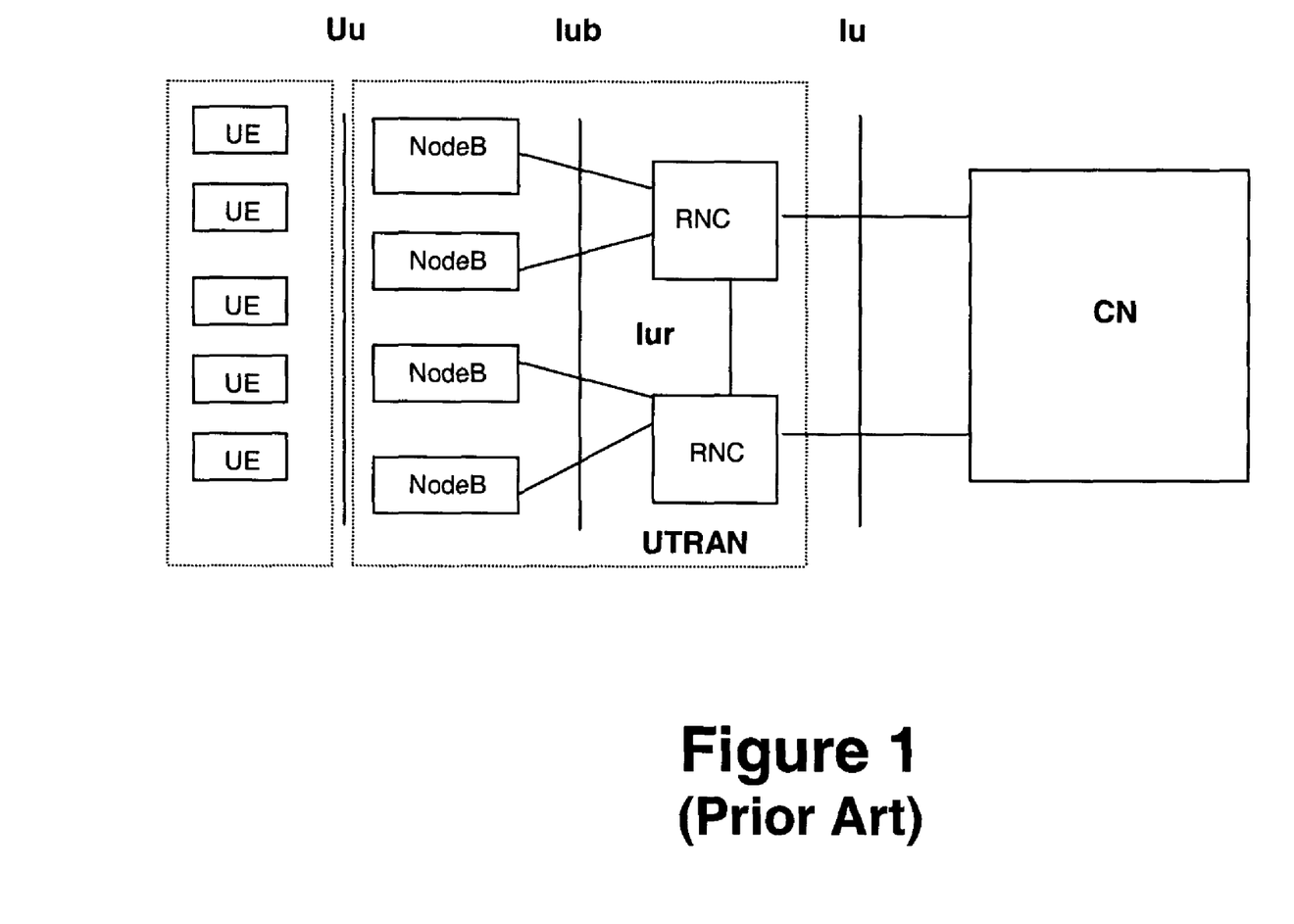
FIG. 1 shows an overview of a system architecture of a conventional UMTS network.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs, two are shown in the example depicted in FIG. 1. Where more than one RNC is provided in a UTRAN, inter-RNC communication is performed via an Iur interface. Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

An RNC has several logical roles depending on the CN's needs. Generally, these functions are divided into two components: a serving RNC (S-RNC) and a controlling RNC (C-RNC). As a serving RNC (S-RNC), the RNC functions as a bridge to the CN and the Node Bs. As a controlling RNC (C-RNC), the RNC is responsible for the configuration of a base station's hardware. The C-RNC also controls data transfers and handles congestion between different base stations. A third logical role of an RNC is as a drift RNC. As a Drift-RNC, the RNC is responsible for handing off the UE equipment to another base station as the UE traverses the coverage area.

The RNCs and the base stations together perform radio resource management (RRM) operations, such as "inner loop power control". This is a feature to prevent near-far problems. Generally, for example, if several WRTUs transmit at the same power level, the WRTUs closest to a base station may drown the signals from the WRTUs that are farther away. The base station checks the power received from the different WRTUs and transmits commands to the WRTUs to reduce or increase power until the base station receives the power from each WRTU at about the same level.

It would be desirable to have a unified system that accommodates addressing interactions among many RRM algorithms, while considering the overall system operation.

The inventors have recognized that a Finite State Machine (FSM) is an ideal choice to handle RRM for a wireless communication system because the number of addressable concerns is limited and the same types of concerns repeat numerous times. A primary benefit of using a FSM approach for RRM is that a given RRM algorithm will behave differently depending on the load of the system. Also some RRM algorithms may be inhibited in certain load conditions. The inventors have recognized that a FSM can be provided where various states correspond to various load conditions. In general, the FSM allows an efficient and coordinated behavior of RRM algorithms that matches a current system load level or other criteria the define the operational states of the FSM.

The use of FSMs for control systems is generally known in prior art, but not for the implementation of RRM. For example, U.S. Pat. No. 6,408,228 to Seem et al, entitled Hybrid Finite State Machine Environmental System Controller, teaches the use of several controllers, or a single controller operating in several sets of control parameters sequentially operating for controlling system operation. Certain prior art patents teach the use of a single RRM algorithm, e.g., relating to a handover, and are exemplified by U.S. Pat. No. 5,884,175 to Schiefer et al, U.S. Pat. No. 6,163,524 to Magnusson et al, and U.S. Pat. No. 6,377,817 131 to Hakaste et al.

SUMMARY

A holistic radio resource management (RRM) methodology and system for a wireless mobile telecommunications system is implemented using finite state machines (FSMs) that allows for optimal RRM decisions based on various radio system load considerations triggers. This holistic system approach coordinates the operations, as well as the interactions between many of the system's RRM algorithms, thus providing an overall RRM methodology.

A Radio Resource Management (RRM) component is provided for a wireless telecommunication system that provides wireless communication service in predetermined geographic areas to Wireless Transmit Receive Units (WTRUs) within such areas. The RMM component has a plurality of finite state machines (FSMs) for controlling radio resources for a specified geographic area serviced by the telecommunication system. Each FSM is configured with a plurality of states where in a selected set of functions are implemented based on state based parameters. Each FSM is configured with a plurality of state switches for toggling the FSM from one state to a different state in response to changes in the wireless communication load between the telecommunication system and WTRUs within the specified geographic area Where the wireless telecommunication system is a 3GPP system which services geographic areas designated as cells, the RMM component is preferably configured to implement selected functions within a Radio Network Controller (RNC) with respect to a designated cell for which the RNC manages radio resources. In such case, the RMM component is preferably configured to implement selected Control-Radio Network Controller (C-RNC) functions within the RNC. In a preferred configuration, the RMM includes a FSM for implementing Real Time (RT) UpLink (UL) communication functions, a FSM for implementing Real Time (RT) Down Link (DL)) communication functions, a FSM for implementing Non Real Time (NRT) UpLink (UL) communication functions, and a FSM for implementing Non Real Time (NRT) Down Link (DL) communication functions.

Each FSM can be, for example, configured with a normal state, a high state and an overload state and each state is associated with two switches, each to toggle to one of the other two states. Preferably, each state switch is operable to toggle a FSM to return to one state from a different state is configured to operate based on a threshold that includes a hysterisis factor that is complementary to a threshold upon which the respective state switch is configured to operate the FSM to switch from the one state to the different state. Where the RMM component is configured to implement selected C-RNC functions for Time Division Duplex (TDD) communications having a predetermined Time Slot format, the FSM state switches are preferably configured to toggle the respective FSM from one state to a different state in response to changes in the wireless communication load within Time Slots. In such case, preferably a first time slot load threshold TST1 is selected so that each state switch operable to toggle a FSM from the normal state to the high state is configured to operate when the load in at least one time slot exceeds the first threshold TST1, and each state switch operable to toggle a FSM from the normal state or the high state to the overload state is configured to operate when the load in at least a predetermined percentage X of timeslots allocated in the cell exceed the first threshold TST1. In such case, a second time slot load threshold TST2 is preferably selected based on the first threshold TST1 minus a hysterisis factor so that each state switch operable to toggle a FSM to return to the normal state from the high state or the overload state is configured to operate when the load in all time slots falls below the second threshold TST2 and each state switch operable to toggle a FSM to return to the high state from the overload state is configured to operate when the load in at least 100-X percentage of timeslots allocated in the cell fall below the second threshold TST2.

A method of Radio Resource Management (RRM) for a wireless telecommunication system that provides wireless communication service in predetermined geographic areas to Wireless Transmit Receive Units (WTRUs) within such areas is disclosed. A plurality of finite state machines (FSMs) are provided such as referenced above where each FSM is configured with a plurality of states where in a selected set of functions are implemented based on state based parameters. Radio resources for a specified geographic area serviced by the telecommunication system are controlled by toggling the FSMs from one state to a different state in response to changes in the wireless communication load between the telecommunication system and WTRUs within the specified geographic area Where the wireless telecommunication system is a 3GPP system which services geographic areas designated as cells, the provided FSMs are configured to implement selected functions within a Radio Network Controller (RNC) with respect to a designated cell for which the RNC manages radio resources.

Other object and advantage will be apparent from the following description of preferred embodiments, and the accompanying drawings.

| TABLE OF ACRONYMS | |
|---|---|
| 2G | Second Generation |
| 2.5G | Second Generation Revision |
| 3GPP | Third Generation Partnership Project |
| BER | Bit Error Rate |
| BLER | Block Error Rate |
| CAC | Call Admission Control |
| CCPCH | Common Control Physical Channel |
| CCTrCH | Coded Composite Transport Channel |
| CDMA | Code Division Multiple Access |
| CN | Core Network |
| C-RNC | Controlling Radio Network Controller |
| CRC | Cyclic Redundancy Check |
| DCA | Dynamic Channel Allocation |
| DCH | Data Channel |
| DL | Downlink |
| DL NRT RRM FSM | DownLink Non-Real Time Radio Resource Management Finite State Machine |
| DL RT RRM FSM | DownLink Real Time Radio Resource Management Finite State Machine |
| DPCH | Dedicated Physical Control Channel |
| ETSI SMG | European Telecommunications Standard Institute —Special Mobile Group |
| F-DCA | Fast-DCA |
| FDD | Frequency-Division Duplex |
| FSM | Finite State Machine |
| GPRS | General Packet Radio Service |
| GSM | Global System for Mobile Telecommunications |
| HO | Handover |
| ISCP | Interference Signal Code Power |
| LM | Link Maintenance |
| NRT | Non-Real Time |
| PRACH | Physical Random Access Channel |
| PSTN | Public Switched Telephone Network |
| PUSCH | Physical Uplink Shared Channel |
| QoS | Quality of Service |
| RAB | Radio Access Bearer |
| RB | Radio Bearer |
| RL | Radio Link |
| RNC | Radio Network Controller |
| RNSAP | Radio Network Subsystem Application Part |
| RNTI | Radio Network Temporary Identifier |
| RRC | Radio Resource Control |
| RRM | Radio Resource Management |
| RT | Real Time |
| RU | Resource Unit |
| SCC | Slow Congestion Control |
| S-RNC | Serving Radio Network Controller |
| S-RNTI | Serving RNTI |
| TDD | Time Division Duplex |
| TDMA | Time Division Multiple Access |
| TFC | Transport Format Combination |
| TS | Time Slot |
| TS- | Technical Specification |
| TST | Time Slot Threshold |
| UE | User Equipment |
| UL | Uplink |
| UL NRT RRM FSM | UpLink Non-Real Time Radio Resource Management Finite State Machine |
| UL RT RRM FSM | UpLink Real Time Radio Resource Management Finite State Machine |
| UMTS | Universal Mobile Telecommunications System |
| U-RNTI | |
| USCH | Uplink Shared Channel |
| UTRAN | UMTS Terrestrial Radio Access Network |
| WTRU | Wireless Transmit Receive Unit |

DETAILED DESCRIPTION OF THE PREFERRED EMBODIMENT(S)

The present invention is described with reference to the drawing figures wherein like numerals represent like elements throughout. The radio resource management (RRM) component of a wireless communication system of the invention employs Finite State Machine (FSM) components for implementing efficient utilization of the air interface resources that provides wireless service to WRTUs in a defined geographic service area. FSM implementation of RRM is used to provide a high quality of service (QoS) to WRTUs over the service coverage area. Other implemented functions may include system access control for, inter alia, admission control and congestion control, WRTU mobility handover, dynamic channel allocation, radio environment survey and RF power control.

FSM implementation of RRM has broad application to virtually any type of wireless communication systems. Preferably, the FSM is compliant with the Universal Mobile Telecommunications System (UMTS) requirements as specified by the 3rd Generation Partnership Project (3GPP) technical specification TS-25.401, entitled "UTRAN Overall Description". The invention described below may be implemented in a wireless time-division duplex (TDD) RRM, but those of ordinary skill in the art will already recognize the invention applicability to frequency-division duplex (FDD) or other wireless mode.

The holistic RRM system of the present invention is responsible for controlling the utilization of the air interface resources with the objectives to provide a high quality of service (QoS) and high capacity while maintaining the planned coverage area.

Figure 2:
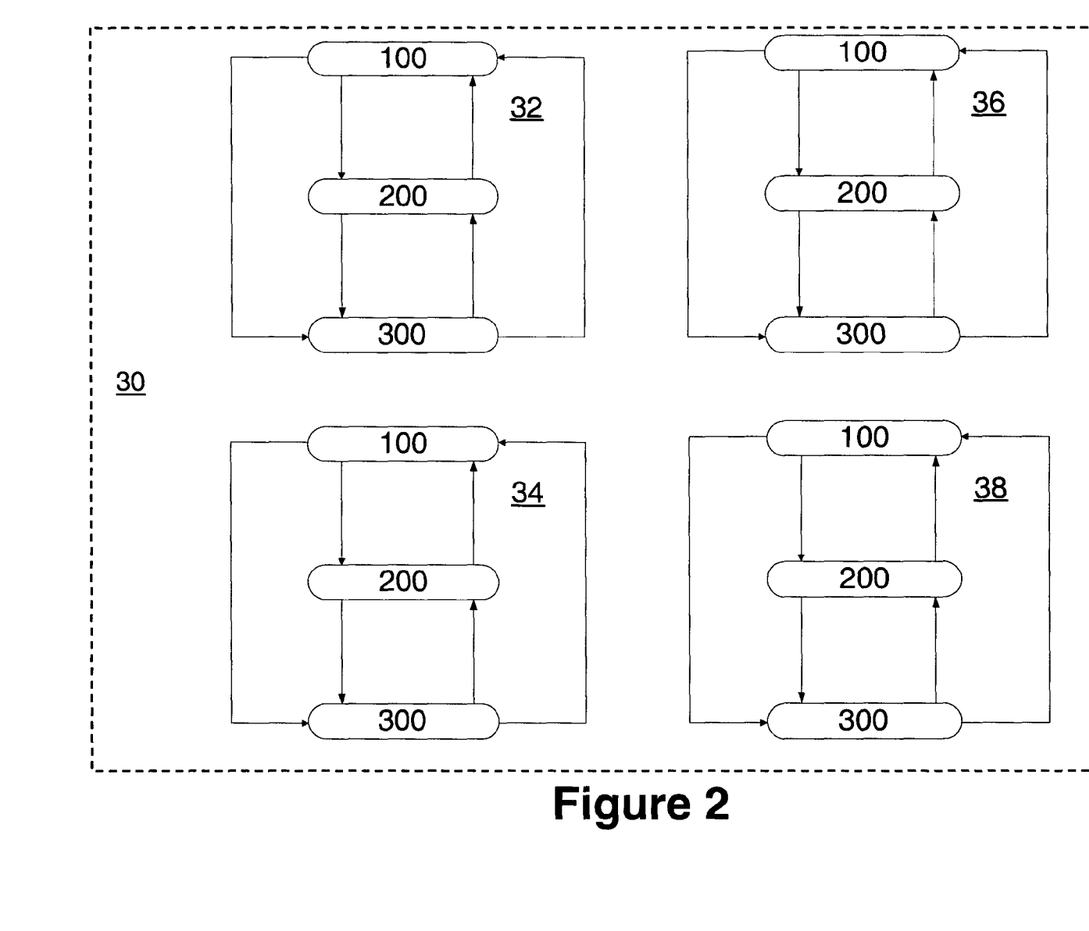
FIG. 2 is a schematic diagram of a holistic Radio Resource Management (RRM) component of a wireless communication system implemented utilizing Finite State Machines (FSMs) in accordance with the teachings of the present invention.

FIG. 2 illustrates a top level view of a holistic RRM component 30 of a telecommunication system in accordance with the teachings of the present invention. The holistic RRM component 30 preferably includes four FSMs: 1) an UpLink Real Time Radio Resource Management Finite State Machine 32 (UL RT RRM FSM); 2) a DownLink Real Time Radio Resource Management Finite State Machine 34 (DL RT RRM FSM); 3) an UpLink Non-Real Time Radio Resource Management Finite State Machine 36 (UL NRT RRM FSM); and 4) a DownLink Non-Real Time Radio Resource Management Finite State Machine 38 (DL NRT RRM FSM). Such a configuration is particularly useful in implementing RRM in a Radio Network Controller (RNC) of a 3GPP UMTS. The RRM 30 is preferably configured to operate the C-RNC functions of an RNC in accordance with 3GPP standards.

Preferably, each of the FSMs 32, 34, 36 and 38 are configured with a similar structure. However, the RRM functionality of each FSM differs in accordance with their respective functions.

Figure 3:
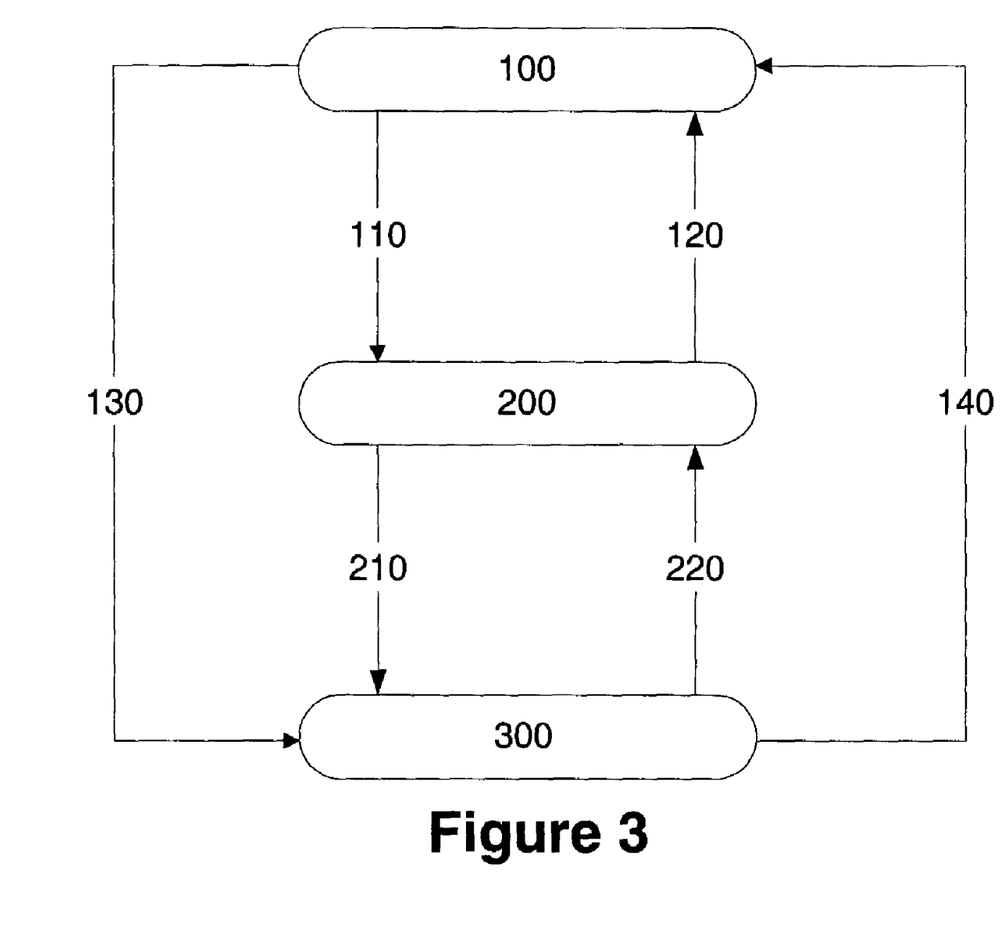
FIG. 3 is a schematic diagram of one FSM of the RRM component of FIG. 2.

The RRM states for the FSMs are based on system load and can also take into account the availability of physical channel resources. As best seen in FIG. 3, each FSM preferably has three states: 1) a normal load state 100; 2) a high load state 200; and 3) an overload state 300. Complementary pairs of state switches, 110 and 120, 210 and 220, 130 and 140 are provided that operate to toggle between different states, preferably based on thresholds determined as a function of the communications load. Preferably, a hysterisis factor is provided in setting threshold criteria for complementary state switches.

A high load state switch 110 switches operation from the normal load state 100 to the high load state 200 when a high load threshold is exceeded. A normal load return state switch 120 switches operation back to the normal load state 100 from the high load state 200 when the load drops below the high load threshold. An overload state switch 210 switches operation from the high load state 200 to the overload state 300 when an overload threshold is exceeded. A high load return state switch 220 switches operation back to the high load state 200 from the overload state 300 when the load drops below the overload threshold.

State switches are also provided to toggle between the normal load state 100 and the overload state 300. An overload state switch 130 switches operation from the normal load state 100 directly to the overload state 300 when the overload threshold is exceeded while the FSM is operating in its normal state 100. This can occur since the evaluation of the thresholds is not instantaneous and multiple WRTUs can place demands on the network at the same or nearly the same time. Also, it is possible that a single WRTU demand requiring a large amount of resources way be enough to exceed the higher overload threshold even if the high load threshold was not exceeded prior to such a service demand. A normal load return state switch 140 switches operation to the normal load state 100 directly from the overload state 200 when the load drops below the high load threshold when operating in the overload state. This can happen when multiple WRTUs disconnect at the same or substantially the same time or possibly when a single communication that is utilizing a great deal or resources in terminated.

Preferably, a degree of hysteresis for the return state switches is provided to prevent ping ponging between any given pair of states. For example, a drop of a predetermined amount below the high load threshold can be required before the return state switch 120 switches operation back to the normal load state 100 from the high load state 200.

Other configurations are possible. For example, the FSMs can be configured with five states such as: 1) a no load state; 2) a normal condition state; 3) a low resource units (RUs) available state; 4) a medium system load state; and 5) a high system load state.

In the 3GPP environment, the system load can be characterized as a combination of interference and power information available in a C-RNC. A physical channel RU is defined by code, frequency and time-slot as set forth in the 3GPP TS-25.990. As more WTRUs communicate with the RNC's base stations, the system load will increase.

The system load can be calculated separately for the uplink (UL), i.e. communication signals from WRTUs to base stations, and the downlink (DL), i.e. communication signals from base stations to WRTUs. For example, according to 3GPP technical specification TS-25.225, the UL system load input can be any of the following: (1) UE Tx Power, which is the total UE transmitted power on one carrier in a specified timeslot; (2) Node B Received Total Wide Band Power, the received wide band power in a specified timeslot including the noise generated in the receiver; (3) Node B RSCP, the received power on one Dedicated Physical Control Channel (DPCH), Physical Random Access Channel (PRACH) or Physical Uplink Shared Channel (PUSCH) code; (4) Node B Time Slot (TS) Interference Signal Code Power (ISCP), the interference on the received signal in a specified timeslot measured on a midamble; and (5) UTRAN Transport Channel BER, the estimation of the average bit error rate (BER) of a specific Data Channel (DCH) or Uplink Shared Channel (USCH).

In the 3GPP context, to measure the DL system load, the inputs options are: (1) Node B Tx Carrier Power, which is the ratio between the total transmitted power and the maximum transmission power; (2) Node B Tx Code Power, the transmitted power on one carrier and one channelization code in one timeslot; (3) UE P-Common control physical channel (CCPCH) RSCP; (4) UE transport channel BLER, an estimation of the transport channel block error rate (BLER) based on evaluating the cyclic redundancy check (CRC) on each transport block; and (5) UE TS Interference signal code power (ISCP), the interference on the received signal in a specified timeslot measured on the midamble.

When the RRM 30 is configured to control C-RNC functions in a 3GPP UTRAN, the UL FSMs 32, 36 preferably use one or more of the above UL system load inputs to control state changes and the DL FSMs 34, 38 use one or more of the above DL system load inputs to control state changes. Different inputs can be used for the respective RT FSMs and NRT FSMs state switches with the respective thresholds being determined based at least in part on the type of inputs used.

In operation, the FSMs 32, 34, 36, 38, are preferably initiated in their normal load state 100. However, where a no load state is provided, a FSM is preferably initiated in the no load state. In a no load state there are no WTRUs communicating with base stations associated with the RMM component. Once a communication is established with any WTRU, the FSMs toggle from such a no load state. This generally occurs when a WTRU is first turned on and becomes active or an active WTRU enters the geographic coverage area of at least one of the associated base stations.

After initiation, as WRTUs are turned on or enter the communication system's geographic area of service, the system load generally increases. When an FSM 32, 34, 36, 38 is in its normal load state 100 and the system load increases to exceed the high load threshold value, but not above the overload threshold value, the FSM will toggle from the normal load state 100 to the high load state 200. A further increase in system load above the overload threshold will cause the system to toggle from the high load state 200 to the overload state 300. When an FSM 32, 34, 36, 38 is in its normal load state 100 and the system load increases to exceed the overload threshold value, the FSM will toggle from the normal load state 100 directly to the overload state 300.

As WRTUs are turned off or leave the communication system geographic area of service, the system load decreases. When an FSM 32, 34, 36, 38 is in its overload state 300 and the system load decreases to a predetermined level below the overload threshold value, but not below the high load threshold value, the FSM will toggle from the overload state 300 to the high load state 200. A further decrease in system load to a predetermined level below the high load threshold will cause the system to toggle from the high load state 200 to the normal load state 100. When an FSM 32, 34, 36, 38 is in its overload state 300 and the system load decreases to a predetermined level below the high load threshold value, the FSM will toggle from the overload state 300 directly to the normal load state 100.

In addition to system loads, the RRM FSMs can monitor available resource units (RUs). A resource unit is a single controllable resource employable for unidirectional information transfer over the radio interface. Typical examples for radio communication systems are time and frequency slots in a Time Division Multiple Access (TDMA) transmission scheme and frequency hopping or a portion of radio resource characterized by a code sequence in a Code Division Multiple Access (CDMA) transmission scheme.

An additional low resource state can be included in the FSM configuration. In such case a drop in RUs below a specified level can be used to trigger a state change in the FSMs to the low resource state. However, in the preferred embodiment shown in FIGS. 2 and 3, a separate low resource state is not provided and RU availability level can be used as one factor in calculating high and overload threshold values.

When the RRM 30 is configured for use in implementing C-RNC functions in a 3GPP system which services geographic areas divided into cells, the RRM 30 is preferably used to control radio resources for a particular cell. Where a RNC services more than one cell, a RRM component 30 for C-RNC functions is preferably provided for each cell and is configured with FSMs that switch states based on the load within the cell to which the RRM component 30 is allocated. The cell load threshold for operation of the state switches are preferably based on a Slow Congestion Control (SCC) Rate Control algorithm load calculation.

For a Time Division Duplex (TDD) communications in a 3GPP system, the radio resources are divided into Time Slots (TSs) and CDMA codes and the cell load is preferably based as a function of TS and code congestion. For example, an SCC based Time Slot Threshold (TST), TST1, is selected. The high load threshold can then be set to activate state switch 110 when it is determined that any one TS in the cell exceeds the threshold TST1. The overload threshold can then be set to activate state switches 210 and 130 when it is determined that a certain percentage, X%, of the TSs in the cell exceed the threshold TST1. The percentage X% may, for example, be set at 75% of the cells TSs or some other value, preferably based on operator's requirement for blocking versus dropping requirements.

In such an example, hysteresis used to prevent a ping-pong effect, can be implemented by setting a lower Time Slot Threshold, TST2, where TST2 equals TST1 minus a desired hysteresis factor. The threshold that is then used to activate return state switches 120 and 140 can be set to when it is determined that no TS in the cell exceeds the threshold TST2. The threshold that is then used to activate return state switch 220 can be set to when it is determined that (100-X)%, of the TSs in the cell do not exceed the threshold TST2, i.e., where X=75, 25% of the TSs do not exceed TST2.

Table 1 below provides a preferred listing of the functions by state implemented in the RT FSMs 32, 34 of an RRM component 30 configured for implementing C-RNC functions for TDD communications in a 3GPP system based on cell load. Table 2 below provides a preferred listing of the functions by state implemented in the NRT FSMs 36, 38 of such an RRM component 30.

TABLE 1

RT FSM (UL/DL) of RMM implementing C-RNC in 3GPP

| State | Algorithm | Triggers | Algorithm Behavior (simplified) |
|---|---|---|---|
| Normal Load (100) | CAC | Reception of: RL SETUP REQUEST, RLRECONFIGURATION PREPARE or RL ADDITION REQUEST | Consider max bit rate and below for admission decision and assign physical resources based on accepted rate(see Note 1). |
| | Background TS Load Balancing | Periodic (every 5s) | Check if should equalize the load of the TSs by reallocating one or more CCTrCHs from the most loaded TS to the least loaded one. |
| | Individual UE Escape | Triggered upon threshold crossing of the UE DL ISCP | Check if a specific CCTrCH experiencing high interference in one slot should be reallocated into another slot. |
| | TS Based Escape | Triggered upon threshold crossing of the UL ISCP or Node-B Tx carrier power | Check if one or more CCTrCHs experiencing high interference in one slot should be reallocated into another slot. |
| | TS Based Rate Control | Checks every 5s if Average UL Noise Rise or Average Tx Carrier Power exceeds Threshold. | Check if can perform rate recovery of RB's in a given TS (will not perform any rate reductions). |
| High Load (200) Proactive actions | CAC | Reception of: RL SETUP REQUEST, RLRECONFIGURATION PREPARE or RL ADDITION REQUEST | Consider guaranteed bit rate only for admission decision and assign physical resources based on guaranteed bit rate(see Note 1). |

TABLE 1-continued

RT FSM (UL/DL) of RMM implementing C-RNC in 3GPP

| State | Algorithm | Triggers | Algorithm Behavior (simplified) |
|---|---|---|---|
| taken to try to avoid Overload | Background TS Load Balancing | Periodic (every 5s) | Check if should equalize the load of the TSs by reallocating one or more CCTrCHs from the most loaded TS to the least loaded one. |
| | Individual UE Escape | Triggered upon threshold crossing of the UE DL ISCP | Check if a specific CCTrCH experiencing high interference in one slot should be reallocated into another slot. |
| | TS Based Escape | Triggered upon threshold crossing of the UL ISCP or Node-B Tx carrier power | Check if one or more CCTrCHs experiencing fhigh interference in one slot should be reallocated into another slot. |
| | TS Based Rate Control | Checks every 5s if Average UL Noise Rise or Average Tx Carrier Power exceeds Threshold. | Check if should reduce the rates of one or more RBs in the TS down to guaranteed bit rate (but not below). Will not perform any rate increases. |
| Overload (300) Reactive actions taken to try to stabilize the cell. | CAC | Reception of: RL SETUP REQUEST, RLRECONFIGURATION PREPARE or RL ADDITION REQUEST | Only allow HO into the cell (and consider guaranteed bit rate for admission decision and physical resource assignment). No other types of accesses are admitted. (see Note 1) |
| | Background TS Load Balancing | Periodic (every 5s) | Try to equalize the load of the TSs by reallocating one or more CCTrCHs from the most loaded TS to the least loaded one. |
| | Individual UE Escape | Triggered upon threshold crossing of the UE DL ISCP | Check if a specific CCTrCH experiencing high interference in one slot should be reallocated into another slot. |
| | TS Based Escape | Triggered upon threshold crossing of the UL ISCP or Node-B Tx carrier power | Check if one or more CCTrCHs experiencing high interference in one slot should be reallocated into another slot. |
| | TS Based Rate Control | Checks every 5s if Average UL Noise Rise or Average Tx Carrier Power exceeds Threshold. | First check if need to reduce the rates of one or more RB's in the TS to guaranteed rate. Once all RB's are at guaranteed rate, check to see if should reduce the rates of one or more to below the guaranteed rate. Will not perform any rate increases. |

Note 1:
The C-RNC knows the difference between HO and new RAB establishment. The Enhanced F-DCA CAC requests corresponds to HO if the C-RNC does not have a context for U-RNTI (RNC-ID + S-RNTI) or the C-RNC does have a context and has a radio link assigned.

TABLE 2

NRT (UL/DL) of RMM implementing C-RNC in 3GPP

| State | Algorithm | Triggers | Algorithm Behavior (simplified) |
|---|---|---|---|
| Normal Load (100) | CAC | Reception of: RL SETUP REQUEST, RLRECONFIGURATION PREPARE or RL | Consider max bit rate and below for admission decision and assign physical resources based on accepted rate(see |

TABLE 2-continued

NRT (UL/DL) of RMM implementing C-RNC in 3GPP

| State | Algorithm | Triggers | Algorithm Behavior (simplified) |
|---|---|---|---|
| | | ADDITION REQUEST | Note 3). |
| | Background TS Load Balancing | | N/A for NRT |
| | Individual UE Escape | | N/A for NRT |
| | TS Based Escape | | N/A for NRT |
| | TS Based Rate Control | Checks every 5s if Average UL Noise Rise or Average Tx Carrier Power exceeds Threshold. | Check if can perform rate recovery of RB's in a given TS (will not perform any rate reductions). |
| High Load (200) Proactive actions taken to try to avoid Overload. | CAC | Reception of: RL SETUP REQUEST, RLRECONFIGURATION PREPARE or RL ADDITION REQUEST | For admission decisions consider TFC2 ($2^{nd}$ lowest rate) or lower and assign physical resources based on accepted rate. (See Note 2) |
| | Background TS Load Balancing | | N/A for NRT |
| | Individual UE Escape | | N/A for NRT |
| | TS Based Escape | | N/A for NRT |
| | TS Based Rate Control | Checks every 5s if Average UL Noise Rise or Average Tx Carrier Power exceeds Threshold. | Check if should reduce rate of one or more RB's in a given TS down to TFC2 ($2^{nd}$ lowest rate) but not below. Will note perform any rate increases. (See Note 2) |
| Overload (300) Reactive actions taken to try to stabilize the cell. | CAC | Reception of: RL SETUP REQUEST, RLRECONFIGURATION PREPARE or RL ADDITION REQUEST | Only allow HO and consider TFC1 (lowest rate) for admission decision for HO and assign physical resources based on accepted rate. No other types of accesses are admitted. (See Note 3) |
| | Background TS Load Balancing | | N/A for NRT |
| | Individual UE Escape | | N/A for NRT |
| | TS Based Escape | | N/A for NRT |
| | TS Based Rate Control | Checks every 5s if Average UL Noise Rise or Average Tx Carrier Power exceeds Threshold. | Check if should reduce the rates of one or more RB's in the TS below down to TFC1 (lowest rate). Will not perform any rate increases. (See Note 2) |

Note 2:
Where TFC4 bit rate > TFC3 bit rate > TFC2 bit rate > TFC1 bit rate > 0

Note 3:
The C-RNC knows the difference between HO and new RAB establishment. The Enhanced F-DCA CAC requests corresponds to HO if the C-RNC does not have a context for U-RNTI (RNC-ID + S-RNTI) or the C-RNC does have a context and has a radio link assigned.

In such an embodiment, when in the normal load state 100, where the traffic is expected to be low, the FSMs preferably use maximum bit rate for the user's admission (CAC). Background TS Load Balancing also functions to spread out the load over all the TS, so that no TS encounters load congestion.

In such an embodiment, when the FSMs are in the high load state 200, the traffic starts to be high in most of the TS. To prevent cell overload, new resources are preferably allocated based on the RAB Guaranteed Bit Rate. RABs operating with a rate higher than the Guarantee Bit Rate are decreased to the Guarantee Bit Rate. This preventive action allows freeing resources for new admission.

In such an embodiment, when the FSMs are in the overload state, most of the TSs experience congestion. Escape mechanisms are no longer efficient since there are fewer escape places. The preferred action is to free resources by decreasing the user rate. If the targeted rate is below the Guarantee Bit Rate, a rate re-negotiation is done with the CN. Only new RABs for handover purpose are admitted in the cell. All other RAB requests are rejected.

The above example reflects a preferred configuration of the invention for TDD cell communication control of C-RNC functions in a 3GPP system. The RRM component comprised of FSMs is equally applicable to Frequency Division Duplex (FDD) and the other modes of communications specified in current standards for 3GPP systems. Moreover the invention has applicability beyond 3GPP systems to virtually any wireless system where communications loads vary and radio resources require management.

What is claimed is:

1. A Radio Resource Management (RRM) component for a wireless telecommunication system that provides wireless communication service in predetermined geographic areas to Wireless Transmit Receive Units (WTRUs) within such areas, the RMM component comprising:
    a plurality of finite state machines (FSMs) for controlling radio resources for a specified geographic area serviced by the telecommunication system;
    each FSM configured with a plurality of states where in a selected set of functions are implemented based on state based parameters; and
    each FSM configured with a plurality of state switches for toggling the FSM from one state to a different state in response to changes in the wireless communication load between the telecommunication system and WTRUs within the specified geographic area;
    wherein the wireless telecommunication system is a 3GPP system which services geographic areas designated as cells and the RMM component is configured to implement selected functions within a Radio Network Controller (RNC) with respect to a designated cell for which the RNC manages radio resources; and
    wherein the RMM component is configured to implement selected Control-Radio Network Controller (C-RNC) functions within the RNC and the RMM includes a FSM for implementing Real Time (RT) UpLink (UL) communication functions, a FSM for implementing Real Time (RT) Down Link (DL)) communication functions, a FSM for implementing Non Real Time (NRT) UpLink (UL) communication functions, and a FSM for implementing Non Real Time (NRT) Down Link (DL) communication functions.

2. The invention of claim 1 wherein the RMM component is configured to implement selected C-RNC functions for Time Division Duplex (TDD) communications having a predetermined Time Slot format and wherein the FSM state switches are configured to toggle the respective FSM from one state to a different state in response to changes in the wireless communication load within Time Slots.

3. The invention of claim 2 wherein each FSM is configured with a normal state, a high state and an overload state and each state is associated with two switches, each to toggle to one of the other two states.

4. The invention of claim 3 in which a first time slot load threshold TST1 is selected wherein:
    each state switch operable to toggle a FSM from the normal state to the high state is configured to operate when the load in at least one time slot exceeds the first threshold TST1, and
    each state switch operable to toggle a FSM from the normal state or the high state to the overload state is configured to operate when the load in at least a predetermined percentage X of timeslots allocated in the cell exceed the first threshold TST1.

5. The invention of claim 4 wherein each state switch operable to toggle a FSM to return to one state from a different state is configured to operate based on a threshold that includes a hysterisis factor that is complementary to a threshold upon which the respective state switch is configured to operate the FSM to switch from the one state to the different state.

6. The invention of claim 5 in which a second time slot load threshold TST2 is selected based on the first threshold TST1 minus a hysterisis factor wherein:
    each state switch operable to toggle a FSM to return to the normal state from the high state or the overload state is configured to operate when the load in all time slots falls below the second threshold TST2, and
    each state switch operable to toggle a FSM to return to the high state from the overload state is configured to operate when the load in at least 100-X percentage of timeslots allocated in the cell fall below the second threshold TST2.

7. The invention of claim 1 wherein each FSM is configured with a normal state, a high state and an overload state and each state is associated with two switches, each to toggle to one of the other two states.

8. The invention of claim 7 wherein each state switch operable to toggle a FSM to return to one state from a different state is configured to operate based on a threshold that includes a hysterisis factor that is complementary to a threshold upon which the respective state switch is configured to operate the FSM to switch from the one state to the different state.

9. A method of Radio Resource Management (RRM) for a wireless telecommunication system that provides wireless communication service in predetermined geographic areas to Wireless Transmit Receive Units (WTRUs) within such areas comprising:
    providing a plurality of finite state machines (FSMs), each FSM configured with a plurality of states where in a selected set of functions are implemented based on state based parameters; and
    controlling radio resources for a specified geographic area serviced by the telecommunication system by toggling the FSMs from one state to a different state in response to changes in the wireless communication load between the telecommunication system and WTRUs within the specified geographic area;
    wherein the wireless telecommunication system is a 3GPP system which services geographic areas designated as cells and the provided FSMs are configured to implement selected functions within a Radio Network Controller (RNC) with respect to a designated cell for which the RNC manages radio resources; and
    wherein the providing FSMs includes providing a FSM for implementing Real Time (RT) UpLink (UL) communication functions, a FSM for implementing Real Time (RT) Down Link (DL)) communication functions, a FSM for implementing Non Real Time (NRT) UpLink (UL) communication functions, and a FSM for implementing Non Real Time (NRT) Down Link (DL) communication functions to implement selected Control-Radio Network Controller (C-RNC) functions within the RNC.

10. The method of claim 9 wherein the FSMs are configured to implement selected C-RNC functions for Time Division Duplex (TDD) communications having a predetermined Time Slot format and wherein the toggling the respective FSMs from one state to a different state is in response to changes in the wireless communication load within Time Slots.

11. The method of claim 10 wherein each FSM is configured with a normal state, a high state and an overload state and each state is associated with two switches, each to toggle to one of the other two states and each state switch operable to toggle a FSM to return to one state from a different state operates based on a threshold that includes a hysterisis factor that is complementary to a threshold upon which the respective state switch operates the FSM to switch from the one state to the different state.

12. The method of claim 11 further comprising selecting a first time slot load threshold TST1 and a second time slot load threshold TST2 based on the first threshold TST1 minus a hysterisis factor such that:
  each state switch operable to toggle a FSM from the normal state to the high state operates when the load in at least one time slot exceeds the first threshold TST1,
  each state switch operable to toggle a FSM from the normal state or the high state to the overload state operates when the load in at least a predetermined percentage X of timeslots allocated in the cell exceed the first threshold TST1,
  each state switch operable to toggle a FSM to return to the normal state from the high state or the overload state operates when the load in all time slots falls below the second threshold TST2, and
  each state switch operable to toggle a FSM to return to the high state from the overload state operates when the load in at least 100-X percentage of timeslots allocated in the cell fall below the second threshold TST2.

13. The method of claim 9 wherein each FSM is configured with a normal state, a high state and an overload state and each state is associated with two switches, each to toggle to one of the other two states and each state switch operable to toggle a FSM to return to one state from a different state operates based on a threshold that includes a hysterisis factor that is complementary to a threshold upon which the respective state switch operates the FSM to switch from the one state to the different state.

14. A method of Radio Resource Management (RRM) for a wireless telecommunication system that provides wireless communication service in predetermined geographic areas to Wireless Transmit Receive Units (WTRUs) within such areas comprising:
  providing a plurality of finite state machines (FSMs), each FSM configured with a plurality of states where in a selected set of functions are implemented based on state based parameters; and
  controlling radio resources for a specified geographic area serviced by the telecommunication system by toggling the FSMs from one state to a different state in response to changes in the wireless communication load between the telecommunication system and WTRUs within the specified geographic area;
  wherein the providing FSMs includes providing a FSM for implementing Real Time (RT) UpLink (UL) communication functions, a FSM for implementing Real Time (RT) Down Link (DL)) communication functions, a FSM for implementing Non Real Time (NRT) UpLink (UL) communication functions, and a FSM for implementing Non Real Time (NRT) Down Link (DL) communication functions.

* * * * *

UNITED STATES PATENT AND TRADEMARK OFFICE
CERTIFICATE OF CORRECTION

| | |
|---|---|
| PATENT NO. | : 7,058,398 B2 |
| APPLICATION NO. | : 10/648005 |
| DATED | : June 6, 2006 |
| INVENTOR(S) | : Livet et al. |

It is certified that error appears in the above-identified patent and that said Letters Patent is hereby corrected as shown below:

ON THE FACE PAGE

At section (56), OTHER PUBLICATIONS, page 1, right column, line 3, after "UTRAN", delete "lur" and insert therefor --Iur--.

IN THE ABSTRACT

At section (57), ABSTRACT, page 1, right column, line 3, after the word "dividing", delete "RMM" and insert therefor --RRM--.

IN THE SPECIFICATION

At column 1, line 16, after the word "use", insert --of--.

At column 1, hoe 17, before "RRM", delete "a" and insert therefor --an--.

At column 1, line 27, after the word "considered", delete "as".

At column 2, line 35, after the word "also", delete "provides" and insert therefor --provide--.

At column 2, line 41, before "RNC", delete "a" and insert therefor --an--.

At column 3, line 12, after the word "using", delete "a" and insert therefor --an--.

At column 3, line 16, after the word "that", delete "a" and insert therefor --an--.

At column 3, line 20, after the word "criteria", delete "the" and insert therefor --that--.

At column 3, line 33, before the word "to", delete "131".

At column 3, line 40, after the word "that", delete "allows" and insert therefor --allow--.

At column 3, line 41, after the word "load", delete "considerations" and insert therefor --consideration--.

At column 3, line 49, after the word "The", delete "RMM" and insert therefor --RRM--.

At column 3, line 59, after the word "area", insert ".".

UNITED STATES PATENT AND TRADEMARK OFFICE
CERTIFICATE OF CORRECTION

| | |
|---|---|
| PATENT NO. | : 7,058,398 B2 |
| APPLICATION NO. | : 10/648005 |
| DATED | : June 6, 2006 |
| INVENTOR(S) | : Livet et al. |

It is certified that error appears in the above-identified patent and that said Letters Patent is hereby corrected as shown below:

At column 3, line 62, before the word "component", delete "RMM" and insert therefor --RRM--.

At column 3, line 65, before the word "component", delete "RMM" and insert therefor --RRM--.

At column 4, line 1, before the word "includes", delete "RMM" and insert therefor --RRM--.

At column 4, line 3, before the word "FSM", delete "a" and insert therefor --an--.

At column 4, line 4, before the word "communication", delete "(DL))" and insert therefor --(DL)--.

At column 4, line 4, before the word "FSM", delete "a" and insert therefor --an--.

At column 4, line 6, before the word "FSM", delete "a" and insert therefor --an--..

At column 4, line 13, before the word "FSM", delete "a" and insert therefor --an--.

At column 4, line 18, after the words "Where the", delete "RMM" and insert therefor --RRM--.

At column 4, line 27, before the word "FSM", delete "a" and insert therefor --an--.

At column 4, line 30, before the word "FSM", delete "a" and insert therefor --an--.

At column 4, line 32, after the word "percentage", delete "X" and insert therefor --X %--.

At column 4, line 36, after the word "toggle", delete "a" and insert therefor --an--.

At column 4, line 40, before the word "FSM", delete "a" and insert therefor --an--.

At column 4, line 59, after the word "area", insert --.--.

At column 6, TABLE OF ACRONYMS, line 8, across from "U-RNTI" insert --Utran Radio Network Temporary Identifier--.

At column 7, line 32, after the word "resources", delete "way" and install therefor --may--.

UNITED STATES PATENT AND TRADEMARK OFFICE
CERTIFICATE OF CORRECTION

| | | |
|---|---|---|
| PATENT NO. | : 7,058,398 B2 | |
| APPLICATION NO. | : 10/648005 | |
| DATED | : June 6, 2006 | |
| INVENTOR(S) | : Livet et al. | |

It is certified that error appears in the above-identified patent and that said Letters Patent is hereby corrected as shown below:

At column 7, line 41, after the word "deal", delete "or resources in" and insert therefor --of resources is--.

At column 8, line 13, before the word "options", delete "inputs" and insert therefor --input--.

At column 8, line 37, after the words "with the", delete "RMM" and insert therefor --RRM--.

At column 9, line 25, before "RNC", delete "a" and insert therefor --an--.

At column 9, line 25, before "RRM", delete "a" and insert therefor --an--.

At column 10, line 11, after the words "of the", delete "cells" and insert therefor --cell's--.

At column 10, Table 1, line 2, before the word "implementing", delete "RMM" and insert therefor --RRM--.

At column 11, Table 1, cont'd, line 2, before the word "implementing", delete "RMM" and insert therefor --RRM--.

At column 11, Table 2, line 2, before the word "implementing", delete "RMM" and insert herefor --RRM--.

At column 13, Table 2, cont'd, line 2, before the word "implementing", delete "RMM" and insert therefor--RRM--.

IN THE CLAIMS

At claim 1, column 15, line 17, after the words "areas, the", delete "RMM" and insert therefor --RRM--.

At claim 1, column 15, line 32, before the word "component", delete "RMM" and insert therefor --RRM--.

At claim 1, column 15, line 36, before the word "component", delete "RMM" and insert therefor --RRM--.

UNITED STATES PATENT AND TRADEMARK OFFICE
CERTIFICATE OF CORRECTION

| | | |
|---|---|---|
| PATENT NO. | : 7,058,398 B2 | Page 4 of 6 |
| APPLICATION NO. | : 10/648005 | |
| DATED | : June 6, 2006 | |
| INVENTOR(S) | : Livet et al. | |

It is certified that error appears in the above-identified patent and that said Letters Patent is hereby corrected as shown below:

At claim 1, column 15, line 38, after the words "and the", delete "RMM includes a" and insert therefor --RRM includes an--.

At claim 1, column 15, line 40, before the word "FSM", delete "a" and insert therefor --an--.

At claim 1, column 15, line 42, before the word "FSM", delete "a" and insert therefor --an--.

At claim 1, column 15, line 43, after the words "functions, and", delete "a" and insert therefor --an--.

At claim 2, column 15, line 46, before the word "component", delete "RMM" and insert therefor --RRM--.

At claim 4, column 15, line 59, after the word "toggle", delete "a" and insert therefor --an--.

At claim 4, column 15, line 63, after the word "toggle", delete "a" and insert therefor --an--.

At claim 5, column 16, line 2, before the word "FSM", delete "a" and insert therefor --an--.

At claim 6, column 16, line 11, before the word "FSM", delete "a" and insert therefor --an--.

At claim 6, column 16, line 15, after the word "toggle", delete "a" and insert therefor --an--.

At claim 8, column 16, line 26, before the word "FSM", delete "a" and insert therefor --an--.

At claim 9, column 16, line 38, after the word "states", delete "where in" and insert therefor --wherein--.

At claim 9, column 16, line 54, alter the word "providing", delete "a" and insert therefor --an--.

At claim 9, column 16, line 56, after the word "functions", delete "a" and insert therefor --an--.

UNITED STATES PATENT AND TRADEMARK OFFICE
CERTIFICATE OF CORRECTION

| | | |
|---|---|---|
| PATENT NO. | : 7,058,398 B2 | |
| APPLICATION NO. | : 10/648005 | |
| DATED | : June 6, 2006 | |
| INVENTOR(S) | : Livet et al. | |

It is certified that error appears in the above-identified patent and that said Letters Patent is hereby corrected as shown below:

At claim 9, column 16, line 58, before the word "FSM", delete "a" and insert therefor --an--.

At claim 9, column 16, line 59, before the word "FSM", delete "a" and insert therefor --an--.

At claim 10, column 16, line 67, after the word "toggling", insert --of--.

At claim 11, column 17, line 8, after the word "toggle", delete "a" and insert therefor --an--.

At claim 12, column 17, line 17, after the word "toggle", delete "a" and insert therefor --an--.

At claim 12, column 17, line 20, after the word "toggle", delete "a" and insert therefor --an--.

At claim 12, column 17, line 25, after the word "toggle", delete "a" and insert therefor --an--.

At claim 12, column 17, line 29, after the word "toggle", delete "a" and insert therefor --an--.

At claim 13, column 18, line 3, before the word "FSM", delete "a" and insert therefor --an--.

At claim 14, column 18, line 15, after the word "states", delete "where in" and insert therefor --wherein--.

At claim 14, column 18, line 25, before the word "FSM", delete "a" and insert therefor --an--.

At claim 14, column 18, line 27, before the word "FSM", delete "a" and insert therefor --an--.

At claim 14, column 18, line 29, before the word "FSM", delete "a" and insert therefor --an--.

UNITED STATES PATENT AND TRADEMARK OFFICE
CERTIFICATE OF CORRECTION

| | |
|---|---|
| PATENT NO. | : 7,058,398 B2 |
| APPLICATION NO. | : 10/648005 |
| DATED | : June 6, 2006 |
| INVENTOR(S) | : Livet et al. |

It is certified that error appears in the above-identified patent and that said Letters Patent is hereby corrected as shown below:

At claim 14, column 18, line 30, before the word "FSM", delete "a" and insert therefor --an--.

Signed and Sealed this

Twenty-sixth Day of December, 2006

JON W. DUDAS
*Director of the United States Patent and Trademark Office*